(12) United States Patent
Apert et al.

(10) Patent No.: US 11,543,837 B2
(45) Date of Patent: Jan. 3, 2023

(54) DEVICE AND METHOD FOR DISTRIBUTING A FLUID IN AN INDUSTRIAL FACILITY

(71) Applicant: L'Air Liquide, Societe Anonyme pour l'Etude et l'Exploitation des Procedes Georges Claude, Paris (FR)

(72) Inventors: Zahra Apert, Paris (FR); Francois Demoisy, Great (BE); Alban Pivard, Le Perreux (FR)

(73) Assignee: L'Air Liquide, Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 234 days.

(21) Appl. No.: 16/954,825

(22) PCT Filed: Dec. 17, 2018

(86) PCT No.: PCT/FR2018/053350
§ 371 (c)(1),
(2) Date: Jun. 17, 2020

(87) PCT Pub. No.: WO2019/122668
PCT Pub. Date: Jun. 27, 2019

(65) Prior Publication Data
US 2021/0096583 A1    Apr. 1, 2021

(30) Foreign Application Priority Data
Dec. 22, 2017 (FR) ........................................ 1762899

(51) Int. Cl.
*G05D 7/06* (2006.01)
*F17C 9/00* (2006.01)
(Continued)

(52) U.S. Cl.
CPC ............. *G05D 7/0623* (2013.01); *F17C 9/00* (2013.01); *F17C 13/025* (2013.01);
(Continued)

(58) Field of Classification Search
CPC ...... G05D 7/0623; G05D 7/0652; F17C 9/00; F17C 13/025; F17C 13/026; F17C 13/04;
(Continued)

(56) References Cited

U.S. PATENT DOCUMENTS

| 4,905,727 A | 3/1990 | Gavrila |
| 8,053,941 B2 * | 11/2011 | Moore ................... H02K 5/128 |
| | | 310/86 |

(Continued)

FOREIGN PATENT DOCUMENTS

| DE | 10 2004 033453 | 1/2006 |
| DE | 10 2016 203330 | 9/2017 |
| EP | 3 002 497 | 4/2016 |

OTHER PUBLICATIONS

International Search Report and Written Report for PCT/FR2018/053350, dated Mar. 18, 2019.

*Primary Examiner* — Timothy P. Kelly
*Assistant Examiner* — Christopher M Afful
(74) *Attorney, Agent, or Firm* — Justin K. Murray (57) ABSTRACT

The invention can include a device and method for distributing a fluid in an industrial facility that comprises a fluid distribution pipe, a discharge pipe, a distribution valve that is positioned on the distribution pipe and controlling the distribution of fluid between an upstream area and a downstream area, a discharge valve positioned on the discharge pipe, and measuring means for measuring, in real time, a characteristic parameter of the distribution of the fluid within one of the pipes. A module is also included for calculating a sliding threshold value of the characteristic
(Continued)

parameter and means configured to control the partial gradual opening or closing of the discharge valve depending on the result of the comparison of said sliding threshold value with an instantaneous value of the characteristic parameter, in order to improve reliability of the industrial facility.

4 Claims, 3 Drawing Sheets

(51) Int. Cl.
    *F17C 13/02*     (2006.01)
    *F17C 13/04*     (2006.01)
    *G05B 19/4155*     (2006.01)

(52) U.S. Cl.
    CPC ............ *F17C 13/026* (2013.01); *F17C 13/04* (2013.01); *G05B 19/4155* (2013.01); *G05D 7/0652* (2013.01); *F17C 2205/0332* (2013.01); *F17C 2205/0352* (2013.01); *F17C 2250/043* (2013.01); *F17C 2250/0408* (2013.01); *F17C 2250/0439* (2013.01); *F17C 2250/0443* (2013.01); *F17C 2250/0447* (2013.01); *F17C 2250/072* (2013.01); *G05B 2219/35382* (2013.01)

(58) Field of Classification Search
    CPC ...... F17C 2205/0332; F17C 2205/0352; F17C 2250/0408; F17C 2250/043; F17C 2250/0439; F17C 2250/0443; F17C 2250/0447; F17C 2250/072; F17C 2219/35382; F17C 2205/0326; G05B 19/4155; G05B 2219/35382
    USPC ........................................................ 700/282
    See application file for complete search history.

(56) References Cited

U.S. PATENT DOCUMENTS

| | | | | |
|---|---|---|---|---|
| 2006/0272709 | A1* | 12/2006 | Ting | A23L 3/0155 137/487.5 |
| 2016/0245273 | A1* | 8/2016 | Wagner | F04B 49/007 |
| 2019/0003649 | A1* | 1/2019 | Lambert | F17C 13/025 |

* cited by examiner

DEVICE AND METHOD FOR DISTRIBUTING A FLUID IN AN INDUSTRIAL FACILITY

CROSS REFERENCE TO RELATED APPLICATIONS

This application is a § 371 of International PCT Application PCT/FR2018/053350, filed Dec. 17, 2018, which claims the benefit of FR1762899, filed Dec. 22, 2017, both of which are herein incorporated by reference in their entireties.

FIELD OF THE INVENTION

The invention relates to the field of industrial facilities using one or more fluids, and it relates more particularly to the distribution of these fluids within such facilities.

BACKGROUND OF THE INVENTION

In a known manner, such facilities comprise at least one distribution valve, also called a production valve, arranged on a distribution line in order to control the distribution of fluid between an upstream area, or production area, from which the fluid transported by the distribution line originates, and a downstream area to which the fluid transported by the distribution line is conveyed. The term "line" is understood here to mean the pipe or pipes through which the fluid is transported for distribution in the facility concerned.

The facilities concerned by the invention also comprise, in a known manner, at least one valve, called a discharge valve, configured to evacuate the fluid when the demand downstream slows down or stops and any slowing down or stopping of the supply of fluid upstream is not envisageable or is not sufficient to avoid overloads in the distribution line.

The discharge valve therefore prevents or, at least, limits such overloads, which risk damaging components of the facility upstream of the distribution valve or impairing the quality of the production fluid. The discharge valve is conventionally arranged on a discharge line which is in communication with a main pipe for distributing the fluid, constituting a branch of this main pipe, for example. The discharge valve may, for example, be a vent valve or a flare valve.

More precisely, the discharge valve is commanded to open as soon as an incident which could lead to an overload is detected on the distribution line: for example, when the fluid is a gas, as soon as an overpressure of this gas is detected on the distribution line.

The known methods for controlling such a discharge valve generally comprise a step of comparing the value of a parameter characteristic of the distribution of fluid with a previously defined threshold value. The opening and/or closing of the discharge valve are then governed by the result of this comparison. The parameter characteristic of the distribution of fluid may be, for example, in the case where the fluid is a gas, the pressure of the fluid or, in the case where the fluid is a liquid, the flow rate of the fluid. The threshold value is conventionally defined on the basis of a value of the characteristic parameter in question, predefined by calibration of the distribution line, a value to which a previously defined safety margin value is applied.

It is easy to understand here the technical problem which arises when defining this safety margin value: if the safety margin value is too high, the opening of the discharge valve will only occur upon significant variations in the parameter in question with respect to the value predefined by calibration, with the risk that the components of the distribution line may be damaged or disrupted due to insufficient sensitivity in the control of the discharge valve.

On the other hand, if the safety margin value is too low, the discharge valve will be commanded to open upon small variations in the parameter in question with respect to the value predefined by calibration, with the risk of untimely opening of this discharge valve and, therefore, the risk of loss of fluid and a potential additional cost for the process implemented by the industrial facility.

SUMMARY OF THE INVENTION

Certain embodiments of the invention aim to overcome these drawbacks and propose a solution for controlling the opening or closing of the discharge valve as precisely as possible to avoid any loss of fluid, while ensuring protection of the components of the fluid distribution line.

To this end, the subject of the invention is a distribution device for distributing a fluid in an industrial facility, the distribution device comprising at least one fluid distribution pipe configured to transport the fluid between an upstream area and a downstream customer of the distribution device, a discharge pipe originating from the distribution pipe, a distribution valve placed on the distribution pipe and controlling the distribution of the fluid between the upstream area and the downstream customer, a discharge valve placed on the discharge pipe, and measurement means for measuring, in real time, a characteristic parameter of the fluid within one of the pipes, characterized in that the distribution device comprises a module for calculating a sliding threshold value of the characteristic parameter, and means configured to command the partial gradual opening or closing of the discharge valve as a function of the result of the comparison between said sliding threshold value and an instantaneous value of the characteristic parameter measured by the measurement means.

The term "pipe" is understood here to mean a set of one or more fluid transport conduits: the term "pipe" therefore applies, below, indiscriminately to the tubes, hoses and connection elements through which the fluid in question flows.

Advantageously, the invention provides that the discharge pipe opens out directly in the distribution pipe. This means that the discharge pipe and the distribution pipe are in communication with one another, such that the fluid conveyed in the distribution pipe can be easily conveyed, from the latter, to the discharge pipe.

By way of non-limiting example, the discharge pipe may be configured as a branch of the distribution pipe. In other words, the fluid, which flows preferably in the distribution pipe, may be conveyed wholly or only partially in the latter, the other part of the fluid being, in this case, diverted towards the discharge pipe.

Depending on the nature of the industrial facility in question, the downstream customer, to which the fluid is transported, may be, by way of non-limiting examples, a part of the facility in which an industrial process is carried out, or a particular zone of such a process in which a specific step of this process is carried out.

More generally, the downstream customer should be understood here as the part of the industrial facility to which the fluid in question is preferably conveyed by the distribution pipe, the discharge pipe making it possible to divert all or some of the fluid from the distribution pipe, for example when the demand from the downstream customer slows down or stops.

As mentioned above, the discharge valve controls the evacuation of all or some of the fluid to prevent any overload of the distribution pipe and of any equipment (by way of non-limiting examples: the instrumentation) associated with the latter. According to various non-exhaustive embodiments, the discharge valve may be a vent valve or a flare valve.

Advantageously, the distribution device according to the invention comprises a module for calculating a sliding threshold value of a characteristic parameter of the fluid transported in the distribution pipe. The characteristic parameter is in this case advantageously a physicochemical quantity representative of the fluid and/or of its transport in the distribution pipe.

More precisely, the characteristic parameter is a quantity subject to variations that are sufficiently rapid and significant that these variations can serve as a basis for the definition of a threshold value for the control of the discharge valve.

For example, when the fluid in question is a gas, the selected characteristic parameter may be the pressure, the temperature, the flow rate or the composition thereof (non-exhaustive list). When the fluid in question is a liquid or a mixture of liquid and gas, the selected characteristic parameter may be the flow rate, the temperature, the level or the composition thereof (non-exhaustive list). Note that the selected characteristic parameter may also be a combination of different parameters representative of the fluid or of its transport within the distribution pipe, without this negatively affecting the invention.

According to the invention, the sliding threshold value of the selected characteristic parameter is defined by adding a previously defined fixed reference value to a sliding average value calculated in real time by the aforementioned calculation module. More specifically, the invention provides that the aforementioned sliding average value is calculated, over a fixed sliding time interval, from the values measured by the real-time measurement means implemented in the distribution device according to the invention.

The term "real time" should be understood here as meaning that the time interval, fixed and predefined, separating two consecutive calculations of this sliding average value is sufficiently small to reflect the greatest possible number of significant variations in the value of the characteristic parameter over time. According to various alternative embodiments, this time interval may be defined as substantially equal to the time interval separating two consecutive measurements of the characteristic parameter, or it may be predefined as an arbitrary fixed value.

This concept of "real time" also applies, in the context of the invention, to the measurement means defined previously, and must be understood, in the context of the invention, in the sense that the time interval separating two consecutive measurements of the selected characteristic parameter is defined in such a way that the aforementioned measurement means can detect the greatest possible number of significant variations in this parameter.

The real-time measurement means defined previously could therefore be, according to various alternative embodiments of the invention, real-time measurement means in the sense usually attributed to this terminology, or means programmed to perform measurements at time intervals predefined according to the above criteria.

It follows from the above that, according to the invention, the calculation module is configured to calculate an average of the instantaneous values of the selected characteristic parameter over a predefined fixed time interval, one of the limits of which is constantly updated. The calculated average value is therefore indeed a sliding average value, in the sense that it is constantly updated by updating the instantaneous values of the characteristic parameter at the limits of the time interval over which said average is calculated.

According to an advantageous, non-exclusive embodiment of the invention, the fixed reference value added to the sliding average value to obtain the sliding threshold value may be defined, for example, by prior calibration of the distribution line or by prior calibration of the downstream customer.

It may also, according to other embodiments, be defined by calculation as a function of the overall operating parameters of the industrial facility as a whole.

In all cases, it constitutes a form of safety margin for commanding the opening and closing of the discharge valve. However, as the sliding threshold value is constantly updated, this fixed reference value may be selected to be lower than the fixed reference value conventionally added to the fixed value of the selected characteristic parameter used for controlling the discharge valve in systems such as those known in the prior art.

Advantageously, the distribution device according to the invention also comprises means configured to command the partial gradual opening or closing of the discharge valve as a function of the result of the comparison between the aforementioned sliding threshold value and an instantaneous value of the characteristic parameter in question.

According to a preferred, but not exclusive, embodiment, the invention provides that the instantaneous value taken into account for the abovementioned comparison is the last measured instantaneous value of the selected characteristic parameter.

According to another embodiment, the instantaneous value taken into account for this comparison may be, as non-limiting example, the final instantaneous value taken into account for the calculation of the sliding threshold value used for the comparison.

Advantageously, the last measured instantaneous value of the characteristic parameter and the final instantaneous value taken into account for the calculation of the sliding threshold value used for the aforementioned comparison may be coincident.

The partial gradual opening and/or closing of the discharge valve makes it possible to avoid any sudden variation in the characteristic parameter in the distribution pipe resulting from the opening or closing of the discharge valve, which sudden variation could give rise to "water hammer", the consequences of which can be damaging for the various distribution and discharge pipes as well as for the equipment associated with these pipes and/or the downstream customer.

For this purpose, the discharge valve may, by way of non-limiting example, be a valve controlled by a stepper motor.

Advantageously, the distribution device according to the invention may also have one or more of the following features, individually or in combination:

the calculation module is configured to set the sliding threshold value, defined previously, at a constant value as soon as the measured instantaneous value of the selected characteristic parameter exceeds the sliding threshold value updated in real time and the degree of opening of the discharge valve reaches a predefined value. This feature of the invention allows faster stabilization of the measured characteristic parameter, in particular when the evolution of the latter is slow, continuous and inexorable. The degree of opening of the discharge valve is in this case, for example, a percentage opening of this valve, full opening of the valve corresponding to a degree of 100%. Advantageously, the above constant value is selected to be substantially equal to the instantaneous value of the selected characteristic parameter, measured when simultaneously the degree of opening of the discharge valve reaches a predefined value. Preferably, the predefined degree of opening of the discharge valve beyond which the calculation module is configured to set the sliding threshold value at the aforementioned constant value is of the order of a few percent, for example of the order of 5%.

the control means are configured to command a preliminary pre-opening of the discharge valve on the basis of a previously defined item of information on the operation of the distribution line. In other words, the distribution device according to the invention comprises, in this case, a module configured to transmit to the control means a predefined item of information on the operation of the distribution line such that the discharge valve is commanded to open, partially or fully, even before the instantaneous value, measured in real time, of the selected characteristic parameter exceeds the sliding threshold value defined previously. This makes it possible, in particular, to anticipate any expected significant variation, sudden or otherwise, in the selected characteristic parameter.

The invention also relates to a distribution method for distributing a fluid in an industrial facility, which comprises:

a step of measuring, in real time, a characteristic parameter of the fluid, by measurement means placed on a distribution pipe for distributing this fluid, a step of calculating a sliding average value of the characteristic parameter over a predefined fixed time interval, a step of defining a sliding threshold value from the aforementioned sliding average value, a step of comparing the sliding threshold value with an instantaneous value, measured in real time, of the characteristic parameter, a step of gradual partial opening, as a function of the result of the comparison carried out during the preceding step, of a discharge valve placed on a discharge pipe originating from the distribution pipe.

As the sliding threshold value is calculated, as described above, on the basis of a constantly updated average value, and then compared with an instantaneous value of the selected characteristic parameter measured in real time, the method according to the invention does indeed make it possible to carry out precise and optimized control of the discharge valve.

According to different embodiments of the invention and, more precisely, according to the selected characteristic parameter, the opening of the discharge valve may be commanded when the instantaneous value of the selected characteristic parameter rises above the sliding threshold value defined previously, or it may be commanded when the instantaneous value of the selected characteristic parameter falls below this sliding threshold value.

Advantageously, the method according to the invention may also have one or more of the following features, individually or in combination:

the predefined time interval over which the sliding average value of the characteristic parameter is calculated is at least greater than 10 seconds.

the predefined time interval over which the sliding average value of the characteristic parameter is calculated is of the order of 30 to 40 seconds.

the method according to the invention comprises a step of maintaining the sliding threshold value at a constant value of the selected characteristic parameter, as soon as the partial opening of the discharge valve reaches a predefined degree, for example of the order of a few percent, of full opening.

the value taken as the constant threshold value as soon as the opening of the discharge valve reaches the aforementioned predefined degree is the measured instantaneous value of the characteristic parameter at which the sliding threshold value defined previously is exceeded. In other words, the method according to the invention provides that, as soon as the measured instantaneous value of the selected characteristic parameter exceeds the sliding threshold value calculated in real time by the calculation module, and the degree of opening of the discharge valve reaches a predefined value, the threshold value is set, constant, by the calculation module, at the instantaneous value at which the sliding threshold value is exceeded.

the method according to the invention comprises a step of pre-opening of the discharge valve, commanded on the basis of a predefined item of operating information. This applies more particularly to the case where significant variations in the selected characteristic parameter can be anticipated in the operation of the distribution line or of the industrial facility as a whole. In this case, the step of pre-opening of the discharge valve makes it possible to anticipate the expected variation in the characteristic parameter and, thus, to protect in advance the components of the distribution line as well as the downstream customer.

the discharge valve is connected to the open air, a flare, or a storage or recovery area. The invention thus makes it possible, by implementing simple measurement, calculation and control means, to attain permanently adjusted control, in real time, of the opening and/or closing of the discharge valve, thus achieving its aims.

Moreover, it follows from the above that the invention applies to any type of fluid, whether it is a gas, a mixture of gases, a liquid, a mixture of liquids, or a mixture of liquids and gases.

More particularly, the fluid may be a gas and the characteristic parameter of the fluid is the pressure of the latter.

BRIEF DESCRIPTION OF THE DRAWINGS

Further features, advantages and possible applications of the invention are apparent from the following description of working and numerical examples and from the drawings. All described and/or depicted features on their own or in any desired combination form the subject matter of the invention, irrespective of the way in which they are combined in the claims or the way in which said claims refer back to one another.

It should first be noted that while the figures depict the invention in detail for the purposes of implementation, these figures can of course serve to better define the invention, where necessary.

However, it should be remembered that these figures only show some of the possible embodiments according to the invention.

DETAILED DESCRIPTION OF THE INVENTION

Figure 1:
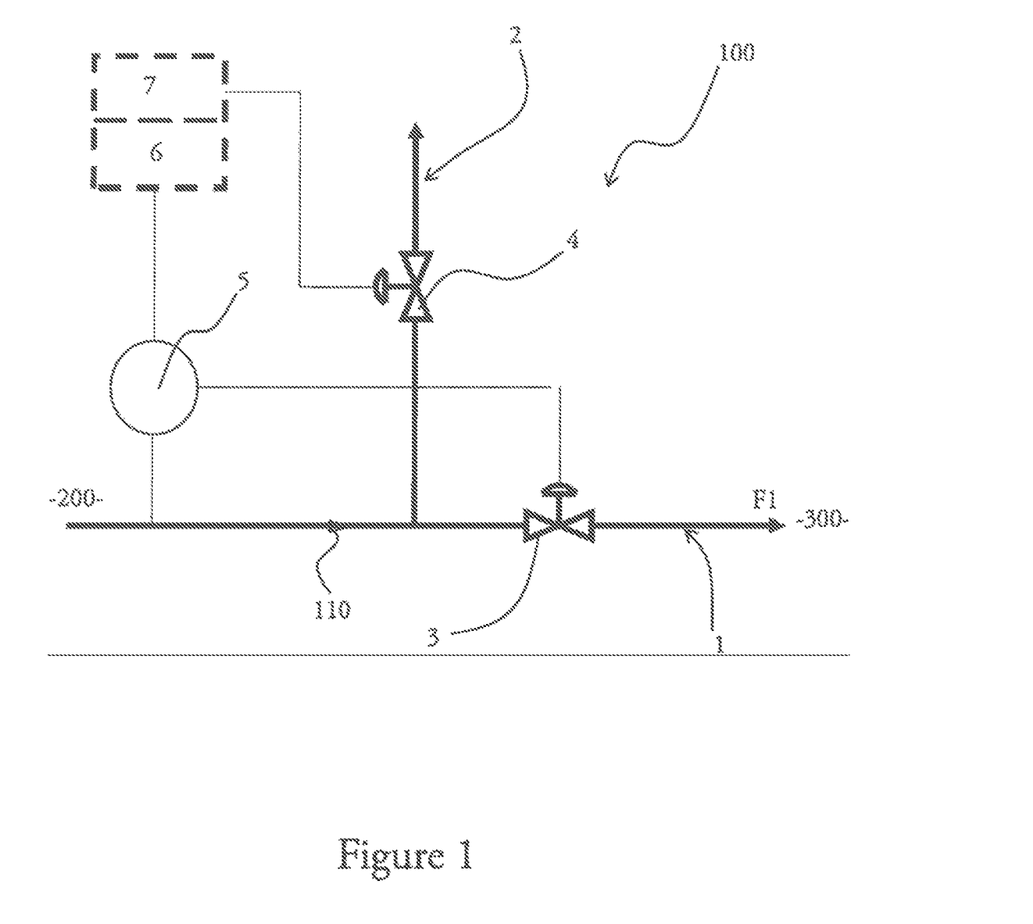
FIG. 1 is a schematic illustration of a fluid distribution device according to the invention, FIG. 2 respectively presents the variations over time in a characteristic parameter of a fluid transported in a distribution line such as that shown diagrammatically in FIG. 1, together with the corresponding variations in the sliding threshold value and in the opening of a discharge valve of such a distribution line, according to a first embodiment of the invention.

FIG. 1 schematically shows a fluid distribution device 100 according to the invention.

The fluid distribution device 100 advantageously forms part of an industrial facility which is not shown in FIG. 1. The distribution device 100 comprises a distribution pipe 1, configured to transport, within the aforementioned industrial facility, a fluid 110, shown by way of example in FIG. 1, between an upstream area 200 and a downstream customer 300: the fluid 110 thus flows in the direction indicated by the arrow F1 in FIG. 1. By way of non-exclusive examples, the upstream area 200 is, for example, a fluid storage area 110, or a part of the industrial facility in which the fluid 110 is obtained, for example as a main product or as a by-product of one or more chemical reactions.

The downstream customer 300 is the part of the industrial facility to which the fluid 110 is transported.

By way of non-exclusive examples, the downstream customer 300 may be the part of the industrial facility in which the process for which said industrial facility was designed is carried out, or the downstream customer 300 may be a part of this industrial facility in which a specific step of said process is carried out.

According to different embodiments of the invention, the fluid 110 may be either a gas, a mixture of gases, a liquid, a mixture of liquids, or a mixture of liquids and gases.

Referring to FIG. 1, the distribution device 100 according to the invention also comprises a discharge pipe 2 originating from the distribution pipe 1, as well as a distribution valve 3 placed on the distribution pipe 1 and a discharge valve 4 placed on the discharge pipe 2. The distribution valve 3 controls the distribution of the fluid 110 to the downstream customer 300 and the discharge valve 4 is, for example, a vent valve or flare valve. According to other exemplary embodiments, the discharge valve 4 may be a valve placing the fluid 110 conveyed in the discharge pipe 2 in communication with a temporary storage area or a recovery area, not shown in FIG. 1. The assembly formed by the distribution pipe 1, the discharge pipe 2, and the distribution 3 valve and the discharge 4 valve, constitutes a line for distribution of the fluid 110 within the industrial facility in which the distribution device 100 according to the invention is located.

The distribution pipe 1 is, within the industrial facility, the preferred route for transporting the fluid 110 between the upstream area 200 and the downstream customer 300. However, it may be that, within the industrial facility, the demand for fluid 110 from the downstream customer 300 slows down or even stops: the invention relates to the case where, when the demand for fluid 110 is slowed down or stopped by the downstream customer 300, it is not possible or not desirable for the industrial facility to slow down or stop, upstream, conveying the fluid 110 from the upstream area 200.

In this case, the excess portion of fluid 110 is conveyed in the discharge pipe 2, originating from the distribution line 1, so as to be evacuated, by opening the discharge valve 4, out of the distribution line defined previously.

As shown schematically in FIG. 1, the discharge pipe 2 is connected branching off from the distribution pipe 1. Thus, when the demand for fluid 110 is slowed down or stopped by the downstream customer 300, all or some of the fluid 110 can be conveyed to the discharge pipe 2. The discharge valve 4 must then be commanded to allow evacuation of the fluid 110 flowing in the discharge pipe 2 to, as the case may be, the open air, a flare, or a storage or recovery area as indicated above.

Advantageously, the opening and, subsequently, closing of the discharge valve 4 are governed by an indication provided by means 5 for measuring, in real time, a characteristic parameter P of the fluid 110. According to the invention, the measurement means 5 perform, in real time, the measurement of a previously selected parameter P which is characteristic of the fluid 110. As mentioned above, in this case "real time" means that the measurement means 5 are configured so that the time interval separating two consecutive measurements is defined in such a way that the greatest possible number of significant variations in the characteristic parameter P are detected. Therefore, the measurement means 5 may, according to different embodiments of the invention, be real-time measurement means in the sense of the terminology commonly used, or they may be programmed to take successive measurements at a time interval predefined according to the above criteria.

The characteristic parameter P is advantageously a physicochemical quantity, the value of which is representative of the fluid 110 and its transport within the distribution device 100. According to different embodiments of the invention and depending on the nature of the fluid 110, the characteristic parameter P may be (non-exhaustive list) the pressure, the temperature, the flow rate, the composition of the fluid 110 in a particular component, or a combination of two or more of these quantities.

According to the invention, the distribution device 100 further comprises a module 6 configured to calculate a sliding threshold value St of the characteristic parameter P and to compare this sliding threshold value St with an instantaneous value Vt of the same characteristic parameter P, measured by said measurement means 5. The distribution device 100 according to the invention also comprises means 7 configured to command, as a function of the result of the comparison between the aforementioned instantaneous value Vt and the sliding threshold value St, the gradual partial opening/closing of the discharge valve. 4.

Figure 2:
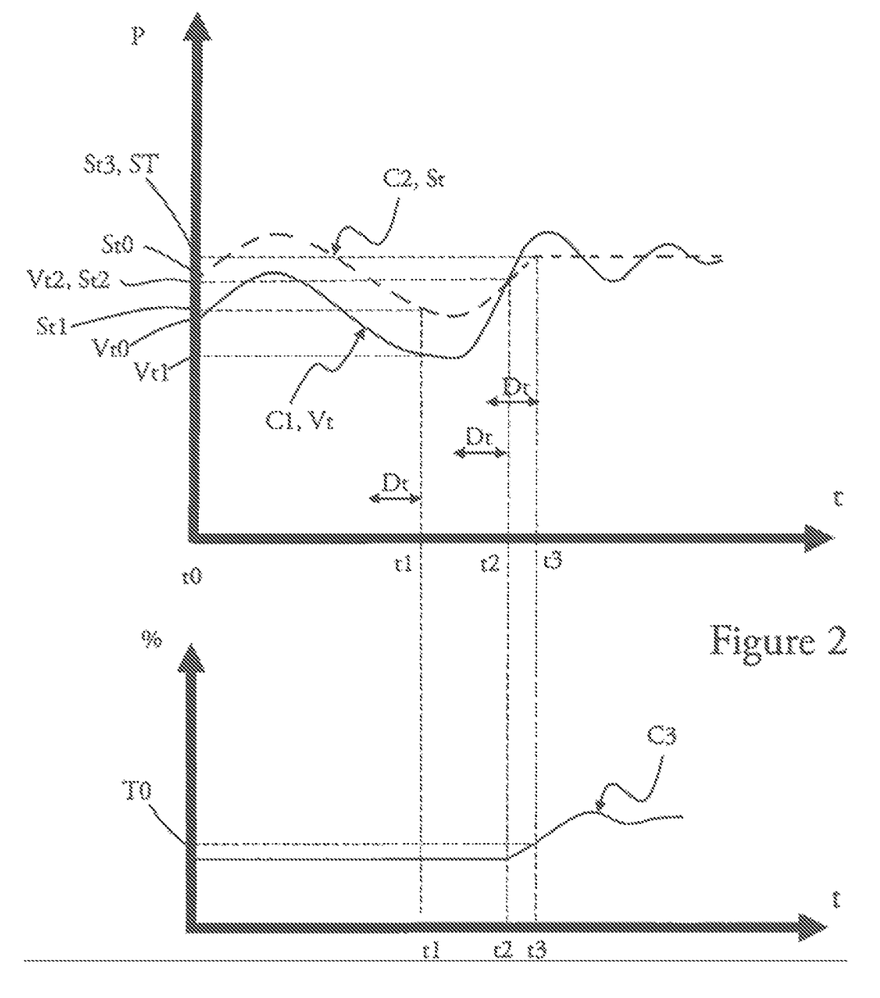
Figure 3:
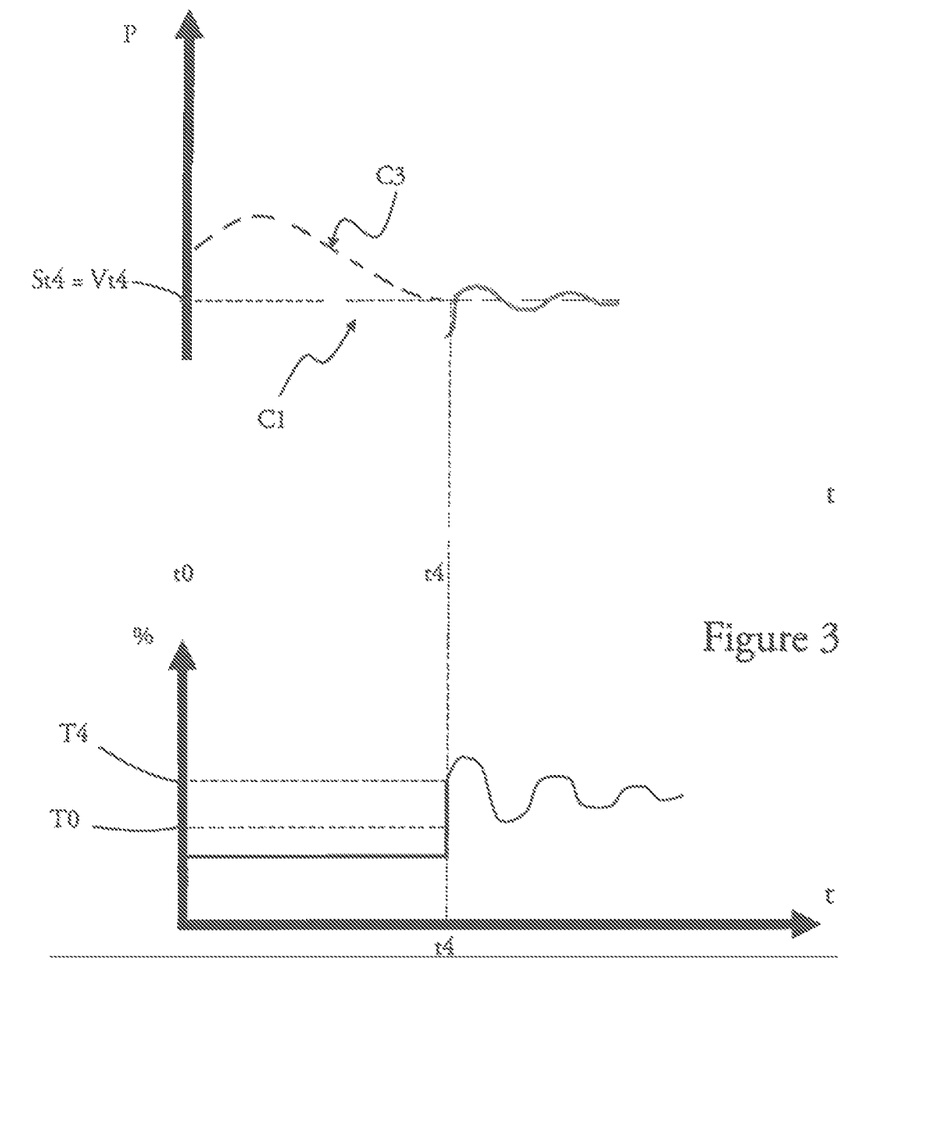
FIG. 3 respectively presents the variations over time in a characteristic parameter of a fluid transported in a distribution line such as that shown diagrammatically in FIG. 1, together with the corresponding variations in the sliding threshold value and in the opening of a discharge valve of such a distribution line, according to a second embodiment of the invention.

The operation of the distribution device 100 according to the invention is depicted more specifically in FIGS. 2 and 3 according to a first and a second embodiment, respectively.

More precisely, FIG. 2 comprises a first curve (curve at the top) on which are schematically shown, on the one hand (curve C1 in solid line), an example of a variation in the characteristic parameter P when the discharge valve 4 is controlled by the distribution device 100 according to the invention in accordance with the method according to the invention implemented by this device and, on the other hand (curve C2 in dashed line), the corresponding variation in the sliding threshold value St defined previously.

It goes without saying that the general profile of variation in the characteristic parameter P was selected to illustrate the operation and the benefits of the invention: while it depicts variation trends commonly encountered in industrial facilities, it is not a precise representation thereof and should be understood as an illustrative example.

In general, according to the invention, the module 6 calculates, at predefined time intervals not shown in the figures, a sliding average value of the instantaneous values Vt over a previously defined time interval Dt.

More specifically, the invention advantageously provides that, at each instant t at which a measurement of the characteristic parameter P is taken by the aforementioned means 5, an average of the instantaneous values Vt of this parameter P is calculated by the calculation module 6 over a time interval Dt, the upper limit of which is said aforementioned instant t.

Advantageously, the time interval Dt over which the sliding average is calculated is at least greater than 10 seconds. According to a particularly advantageous, but not exclusive, embodiment of the invention, this time interval Dt is of the order of 30 to 40 seconds.

The sliding threshold value St according to the invention is obtained by adding, to the sliding average value Mt, a previously determined fixed value. This fixed value is, for example, but not exclusively, defined by a prior calibration of the industrial facility and/or of the distribution line in which the distribution device 100 according to the invention is placed. It may also be defined as a safety margin value calculated according to the parameters of the industrial facility.

With reference to FIG. 2, the initial sliding average is associated with an initial sliding threshold value St0, established by the calculation module 6 on the basis of the instantaneous values of the parameter P measured over the time interval defined by the initial instant t0 and an earlier instant t0-Dt, not shown in FIG. 2.

When the measured instantaneous value of the characteristic parameter P varies, the sliding average is adjusted as is, consequently, the sliding threshold value St.

Thus, with reference to FIG. 2, at a first instant t1, the parameter P has reached a value Vt1, less than the value Vt0. At this first instant t1, the sliding average is calculated on the basis of the values of the parameter P measured successively during the predefined time interval Dt preceding this first instant t1. A new sliding threshold value St1 then results from the new sliding average, and so on until the parameter P exceeds, at a second instant t2, subsequent to the first instant t1, a value Vt2 equal to the sliding threshold value St2 calculated at this second instant t2.

According to the invention, the calculation module 6 is configured to compare, at each instant t at which a measurement of the characteristic parameter P is taken, the sliding threshold value St with the measured instantaneous value Vt of said parameter P, and to command, as a function of the result of this comparison, the means 7, defined previously, to partially open the discharge valve 4 gradually, thus allowing gradual partial evacuation of the fluid 110 present in the discharge pipe 2.

In other words, according to the embodiment depicted more particularly in FIG. 2, at the second instant t2, as the instantaneous value Vt2 of the parameter P is greater than the sliding threshold value St2 calculated over the time interval defined by the instants t2—Dt and t2, the discharge valve 4 is commanded to partially open gradually.

According to the invention, the calculation module 6 is configured to continue updating, in real time, the sliding threshold value St and to command the means 7, defined previously, to gradually open the discharge valve 4, as long as the measured instantaneous value Vt of the characteristic parameter P is greater than the calculated sliding threshold value St, until a third instant t3 at which the degree of opening of the discharge valve 4, depicted by the curve C3 in dotted lines in FIG. 2 (bottom curve), reaches a predefined degree of opening TO.

According to the invention, at this third instant t3, the calculation module 6 is configured to define a fixed threshold value ST of the parameter P and thus convert the sliding threshold value into a fixed threshold value. In other words, as soon as the discharge valve 4 reaches the predefined degree of opening TO, the invention provides that the sliding threshold value St take a fixed value ST, which is constant, and that the latter be equal to the sliding threshold value St3 at the instant t3.

The invention then provides that the discharge valve 4 continues to be controlled beyond the predefined degree of opening TO, until the measured instantaneous value Vt of the characteristic parameter P stabilizes at a value substantially equal to the aforementioned constant fixed threshold value ST.

In other words, according to the embodiment shown more particularly in FIG. 2, the invention provides:
  in a first operating regime, that the sliding threshold value St be updated in real time and compared, in real time, with the measured instantaneous value Vt of the parameter P, the result of this comparison governing the opening of the discharge valve 4,
  in a second operating regime, as soon as the discharge valve 4 is controlled in regulation of the instantaneous value Vt of the parameter P, that the threshold value St be fixed at a constant value ST if the discharge valve 4 reaches a predefined fixed degree of opening.

The aforementioned first operating regime may include a temporary regime of opening of the discharge valve as soon as the instantaneous value of the characteristic parameter P exceeds the adjustable threshold value St, and the second operating regime can be considered as a continuous discharge regime, implemented as soon as it becomes essential to continuously discharge the fluid 110 through the discharge pipe 2.

Advantageously, the aforementioned degree of opening TO of the discharge valve 4 on the basis of which the calculation module 6 is configured to set a constant threshold value of the parameter P is of the order of a few percent of the full opening of this valve: preferably, but not exclusively, it is of the order of 5% of the full opening of the discharge valve 4. It follows from the above that the invention makes it possible to update the parameters for controlling the state of the discharge valve 4 at all times, thereby optimizing the commands for opening or closing the latter.

Note that the gradual partial opening of the discharge valve 4 makes it possible to avoid any sudden variation within the discharge pipe 2, which sudden variation could give rise to "water hammer" which could damage components of the discharge pipe 2 itself, and could have repercussions as far as the distribution line 1, with the risk not only of damaging components of the latter, but also, owing to any sudden variations in the parameter P following this "water hammer", of distorting the calculation of the sliding average Mt, and therefore impairing the quality of the control of the discharge valve 4.

Advantageously, the discharge valve 4 is, for example, a valve the opening and closing of which are commanded by a stepper motor, in order to facilitate gradual partial opening and closing of the valve.

Note also that although, according to the example shown in FIG. 2, the comparison is carried out, at each instant t, between the instantaneous value Vt and the sliding average value Mt calculated at this same instant t, this comparison could, by way of non-limiting example, and without this negatively affecting the invention, be carried out, at each instant t, between the aforementioned sliding average value Mt and the instantaneous value V(t-Dt) measured at the instant t-Dt.

FIG. 3 shows a second embodiment of the invention. This figure depicts the curves C1, C2 and C3 present in FIG. 2 and explained above. FIG. 3 shows, at the top, an example of a variation in a characteristic parameter P of the fluid 110 (curve C1 in solid line) and the associated variation in the sliding threshold value St (curve C3 in dashed lines).

According to the second embodiment of the invention shown in FIG. 3, a pre-opening of the discharge valve 4 is commanded, at a fourth instant t4, by the control means 7 on the basis of information previously received from the calculation module 6. This pre-opening is, for example, commanded when a variation in the characteristic parameter P is expected in the industrial facility, this variation possibly involving opening of the discharge valve 4 according to the operating mode shown for example by the curve C1. Such a configuration makes it possible, in particular, to anticipate significant variations in the parameter P and, therefore, to protect the components of the distribution line in which the distribution device 100 according to the invention is installed. The pre-opening is dimensioned according to the characteristics of the facility, and in particular the dimensions of the conduits and the flow rate of the fluid flowing in these conduits. It is understood that depending on the content of the programmed variation, the pre-opening carried out instantaneously in anticipation of this future variation in the parameter P is to a greater or lesser extent.

According to the example shown more particularly in FIG. 3, the discharge valve 4 is commanded, at the aforementioned instant t4, to open to a value T4 with a value exceeding the degree of opening TO defined previously, at which instant t4 the parameter P increases suddenly.

In accordance with the above, as soon as the opening of the discharge valve exceeds the predefined degree of opening, the invention provides that the calculation module 6 is configured to then define a constant threshold value St4, corresponding, for example, to the instantaneous value Vt4 of the parameter P measured at the instant t4, and that the discharge valve 4 is consequently controlled to adjust the parameter P around this threshold value St4.

The invention as just described certainly achieves its aims in that it makes it possible, by simple means and a simple method, to control a discharge valve 4 of a distribution device 100 for distributing a fluid 110 in an industrial facility.

This control, which is precise and reactive to variations in a quantity P characteristic of the distribution of the fluid 110, makes it possible both to protect the components of the distribution line from any overload, while optimizing the quantities of fluid 110 evacuated by the discharge valve 4 and, therefore, limiting losses of this fluid 110.

However, the invention as just described is not limited solely to the means and configurations described and illustrated, and also applies to any equivalent means or configurations and to any combination of such means or configurations.

In particular, while the invention has been described and illustrated in this document according to embodiments in which the discharge valve 4 is commanded to open as soon as the instantaneous value Vt of the characteristic parameter P rises above a sliding threshold value St, the invention encompasses alternative embodiments according to which the discharge valve 4 is commanded to open as soon as the aforementioned instantaneous value Vt falls below the aforementioned sliding threshold value St.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. A distribution device for distributing a fluid in an industrial facility, the distribution device comprising:
    a fluid distribution pipe configured to transport the fluid between an upstream area and
    a downstream customer of the distribution device;
    a discharge pipe originating from the distribution pipe;
    a distribution valve placed on the distribution pipe and controlling the distribution of fluid between the upstream area and the downstream customer;
    a discharge valve placed on the discharge pipe; and
    a measurement device configured to measure, in real time, a characteristic parameter of the distribution of the fluid within one of the pipes, wherein the distribution device comprises a calculation module configured to calculate a sliding threshold value of the characteristic parameter, and a controller configured to command the partial gradual opening or closing of the discharge valve as a function of the result of the comparison between said sliding threshold value and an instantaneous value of the characteristic parameter measured by the measurement device, wherein the calculation module is configured to set the sliding threshold value at a fixed value as soon as the discharge valve reaches a predefined degree of opening, where the calculation module is further configured to set the fixed threshold value at the instant at which the measured instantaneous measured value of the characteristic parameter exceeds the sliding threshold value.

2. The device as claimed in claim 1, wherein the measurement device comprises at least one gas pressure sensor.

3. The device as claimed in claim 1, wherein the discharge valve is a stepper motor valve.

4. A distribution device for distributing a fluid in an industrial facility, the distribution device comprising:

a fluid distribution pipe configured to transport the fluid between an upstream area and a downstream customer of the distribution device;

a discharge pipe originating from the distribution pipe;

a distribution valve placed on the distribution pipe and controlling the distribution of fluid between the upstream area and the downstream customer;

a discharge valve placed on the discharge pipe; and measurement means for measuring, in real time, a characteristic parameter of the distribution of the fluid within one of the pipes, wherein the distribution device comprises a module for calculating a sliding threshold value of the characteristic parameter, and means configured to command the partial gradual opening or closing of the discharge valve as a function of the result of the comparison between said sliding threshold value and an instantaneous valve of the characteristic parameter measured by the measurement means, wherein the calculation module is configured to set the sliding threshold value at a fixed value as soon as the discharge valve reaches a predefined degree of opening, wherein the predefined degree of opening is of the order of 5%.

* * * * *